United States Patent [19]

Zoltner

[11] Patent Number: 4,492,321
[45] Date of Patent: Jan. 8, 1985

[54] APPARATUS FOR DISPENSING TONER PARTICLES AND SEALING THE STORAGE CHAMBER THEREOF

[75] Inventor: John D. Zoltner, Rochester, N.Y.

[73] Assignee: Xerox Corporation, Stamford, Conn.

[21] Appl. No.: 443,402

[22] Filed: Nov. 22, 1982

[51] Int. Cl.³ ............................................. G01F 11/20
[52] U.S. Cl. .................................. 222/410; 222/548; 222/DIG. 1
[58] Field of Search ............... 222/63, 189, 333, 342, 222/344, 345, 348, 352, 410, 414, 504, 545, 548, DIG. 1; 118/653, 656, 657, 658; 15/183; 141/284

[56] References Cited

U.S. PATENT DOCUMENTS

| | | | |
|---|---|---|---|
| 1,191,116 | 7/1916 | Schippell | 222/189 X |
| 3,149,760 | 9/1964 | Eichorn et al. | 222/238 |
| 3,200,430 | 8/1965 | Haracz | 15/183 |
| 3,881,446 | 5/1975 | Kurita et al. | 118/637 |
| 3,894,510 | 7/1975 | Eto | 118/308 |
| 3,898,956 | 8/1975 | Andrako | 118/637 |
| 4,024,993 | 5/1977 | Hanada | 222/272 |
| 4,237,943 | 12/1980 | Ermel et al. | 141/284 |

FOREIGN PATENT DOCUMENTS 1333221 10/1973 United Kingdom .
853401 8/1981 U.S.S.R. .

*Primary Examiner*—Stanley H. Tollberg
*Assistant Examiner*—Michael S. Huppert
*Attorney, Agent, or Firm*—H. Fleischer; J. E. Beck; R. Zibelli

[57] ABSTRACT

An apparatus in which particles are discharged from the open end of a storage chamber. In the operative mode, a brush mounted movably adjacent the open end of the chamber, is actuated. The brush has at least one row of bristles for dispensing particles from the open end of the storage chamber. In the inoperative mode, the brush is positioned such that the row of bristles seals the open end of the chamber preventing the discharge of particles therefrom.

14 Claims, 6 Drawing Figures

APPARATUS FOR DISPENSING TONER PARTICLES AND SEALING THE STORAGE CHAMBER THEREOF

This invention relates generally to an electrophotographic printing machine, and more particularly concerns an apparatus for dispensing toner particles into the chamber of a developer housing and for sealing the chamber storing the toner particles therein.

In general, the process of electrophotographic printing includes charging a photoconductive member to a substantially uniform potential to sensitize the surface thereof. The charged portion of the photoconductive surface is exposed to a light image of an original document being reproduced. Alternatively, a modulated light beam, i.e. a laser beam, may be utilized to discharge selected portions of the charged photoconductive surface to record the desired information thereon. In this way, an electrostatic latent image is recorded on the photoconductive surface which corresponds to the information desired to be reproduced. After recording the electrostatic latent image on the photoconductive member, the latent image is developed by bringing developer material into contact therewith. Generally, the developer material comprises toner particles adhering triboelectrically to carrier granules. The toner particles are attracted from the carrier granules to form a powder image on the photoconductive member which is subsequently transferred to a copy sheet. Finally, the copy sheet is heated to permanently affix the powder image thereto in image configuration.

One of the problems in electrophotographic printing is that the machine must be transported from the factory to the customer site without toner particles being in the toner hopper. This is due to the fact that during the transportation of the machine, vibration and assorted movement cause the toner particles to be discharged into the developer housing resulting in a developer material having undue concentration of toner particles therein. Hence, when the machine is initially started, the resultant copies are too dark. Heretofore, this problem has been solved by transporting the printing machine from the manufacturing site to the customer site without toner particles. However, this requires an additional step in that the service person, during the set up of the printing machine, must furnish a supply of toner particles to the toner hopper. It would thus be highly desirable to be capable of transporting the printing machine from the manufacturing site to the customer site with the toner particles in the toner hopper. Optimumly, the toner hopper would be capable of discharging particles in the operative mode and remaining sealed in the inoperative mode, i.e. during the transportation cycle or at any other time when not in use. Various techniques have been devised for discharging toner particles from a hopper into the chamber of a developer housing. For example, brushes or foam rollers mounted rotatably in the opening of the hopper have heretofore been employed for discharging toner particles into the developer material. The following disclosures appear to be relevant:

U.S. Pat. No. 3,149,760,
Patentee: Eichorn et al.,
Issued: Sept. 22, 1964.
U.S. Pat. No. 3,898,956,
Patentee: Andrako,
Issued: Aug. 12, 1975.
U.K. Pat. No. 1,333,221,
Assignee: Agfa-Gevaert,
Published: Oct. 10, 1973.

The pertinent portions of the foregoing disclosures may be briefly summarized as follows:

Eichorn et al. describes a toner dispenser having a container with apertures in the lower portion of the base plate thereof. A cylindrical brush, mounted in the container, dispenses toner particles through the aperture therein.

Andrako discloses a toner container having a brush mounted exteriorly of the housing adjacent to the entrance opening. The brush has a bristle mat on its exterior surface and is driven in a rotary direction. The container is positioned such that the bursh acts as a rotating door for the opening between the terminal edges of the sidewalls thereof to discharge toner particles therefrom.

The U.K. patent describes a toner trough having a rotating brush positioned interiorly thereof. The brush forces the toner through the apertures in the trough. The brush bristles, during the rotation thereof, spring into and penetrate the trough holes with a proding motion under the action of their resilient force. Deposits of toner, in these holes, are thus pushed therethrough.

In accordance with one aspect of the features of the present invention, there is provided an apparatus for discharging particles. The apparatus includes means, defining a chamber having at least one open end, for storing a supply of particles therein. A movable brush having at least one row of bristles is positioned adjacent the open end of the chamber of the storing means. The brush, in the operative mode, is movable to discharge particles from the open end of the chamber in the storing means. In the inoperative mode, the brush is positionable so as to locate the row of bristles in the open end of the chamber of the storing means. The row of bristles seals the chamber of the storing means preventing the discharge of particles therefrom.

Pursuant to another aspect of the present invention, there is provided an apparatus for developing an electrostatic latent image recorded on a photoconductive member used in an electrophotographic printing machine. The apparatus includes a housing defining a chamber for storing a supply of developer material comprising at least carrier granules and toner particles therein. Means, defining a chamber having at least one open end, stores a supply of toner particles therein. A movable brush having at least one row of bristles is positioned adjacent the open end of the chamber of the storing means. The brush, in the operative mode, is movable to discharge toner particles from the open end of the chamber in the storing means into the chamber of the housing. In the inoperative mode, the brush is positionable to locate the row of bristles in the open end of the chamber of the storing means. In this way, the row of bristles seals the chamber of the storing means preventing the discharge of toner particles therefrom into the chamber of the housing.

Other aspects of the present invention will become apparent as the following description proceeds and upon reference to the drawings, in which.

While the present invention will hereinafter be described in conjunction with a preferred embodiment thereof, it will be understood that it is not intended to limit the invention to that embodiment. On the contrary, it is intended to cover all alternatives, modifications and equivalents as may be ;included within the spirit and scope of the invention as defined by the appended claims.

Figure 1:
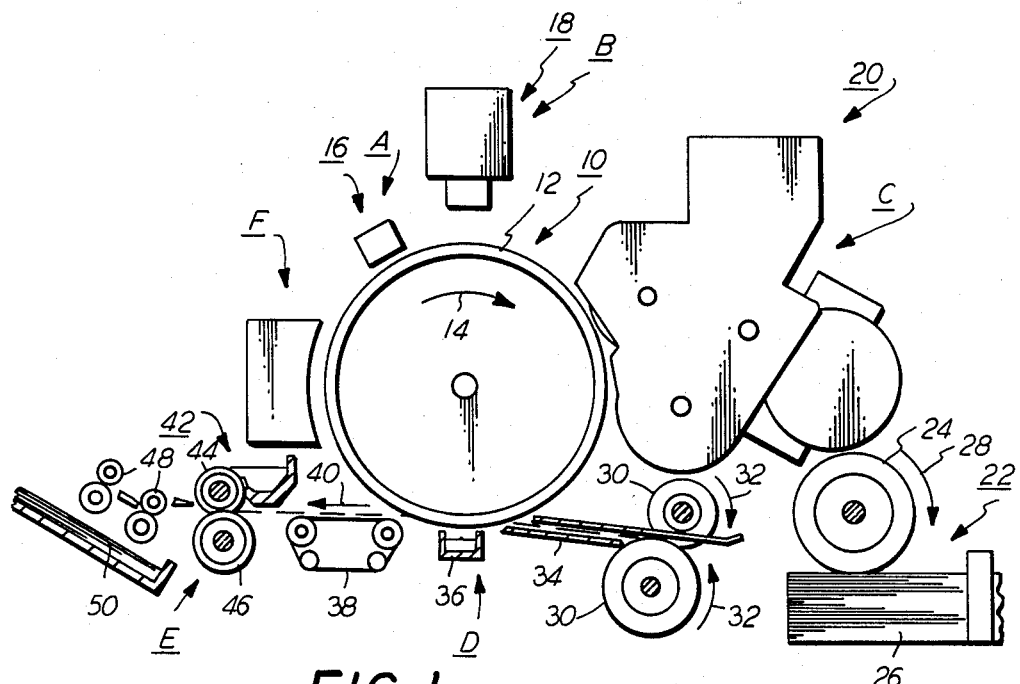
FIG. 1 is a schematic elevational view showing an illustrative electrophotographic printing machine incorporating the features of the present invention therein.

For a general understanding of the features of the present invention, reference is made to the drawings. In the drawings, like reference numerals have been used throughout to designate identical elements. FIG. 1 schematically depicts the various components of an illustrative electrophotographic printing machine incorporating the apparatus of the present invention therein. It will become evident from the following discussion that this apparatus is equally well suited for use in a wide variety of electrostaticgraphic printing machines and is not necessarily limited in its application to the particular embodiment depicted herein.

Inasmuch as the art of electrophotographic printing is well known, the various processing stations employed in the FIG. 1 printing machine will be shown hereinafter schematically and their operation described briefly with reference thereto.

As shown in FIG. 1, the illustrative electrophotographic printing machine employs a drum 10 having a photoconductive surface 12. Preferably, photoconductive surface 12 comprises a selenium alloy deposited on a conductive substrate, such as an aluminum alloy. Drum 10 moves in the direction of arrow 14 to advance successive portions of photoconductive surface 12 sequentially through the various processing stations disposed about the path of movement thereof.

Initially, a portion of photoconductive surface 12 passes through charging station A. At charging station A, a corona generating device, indicated generally by the reference numeral 16, charges photoconductive surface 12 to a relatively high substantially uniform potential.

Next, the charged portion of photoconductive surface 12 is advanced through imaging station B. Imaging station B includes an exposure system, indicated generally by the reference numeral 18. In exposure system 18, an original document is positioned facedown upon a transparent platen. Light rays reflected from the original document are transmitted through a lens to form a light image thereof. The light image is focused onto the charged portion of photoconductive surface 12 to selectively dissipate the charge thereon. This records an electrostatic latent image on photoconductive surface 12 which corresponds to the informational areas contained within the original document. One skilled in the art will appreciate that an optical system of the foregoing type need not be the only type of system employed to selectively dissipate the charge on the photoconductive surface. For example, a modulated light beam, such as a laser beam, may be used to irradiate the charged portion of the photoconductive surface to selectively discharge the charge recording the desired information thereon. After the electrostatic latent image is recorded on photoconductive surface 12, drum 10 advances the latent image to development station C.

At development station C, a magnetic brush development system, indicated generally by the reference numeral 20, transports a developer material of carrier granules having toner particles adhering triboelectrically thereto into contact with the electrostatic latent image. The latent image attracts the charged toner particles forming a powder image on photoconductive surface 12 of drum 10. As the charged toner particles are attracted to the latent image, the concentration thereof, in the developer material, decreases. Thus, additional toner particles are furnished from the hopper storing a supply thereof into the chamber housing the developer material. In this way, the concentration of toner particles within the developer material is maintained substantially constant to achieve optimum copy quality. The detailed structure of development system 20 will be described hereinafter with reference to FIG. 2.

Drum 10 then advances the toner powder image to transfer station D. At transfer station D, a sheet of support material is moved into contact with the powder image. The sheet of support material is advanced to transfer station D by a sheet feeding apparatus, indicated generally by the reference numeral 22. Preferably, sheet feeding apparatus 22 includes a feed roll 24 contacting the uppermost sheet of a stack of sheets 26. Feed roll 24 rotates in the direction of arrow 28 so as to advance the uppermost sheet into the nip defined by forwarding rollers 30. Forwarding rollers 30 rotate in the direction of arrow 32 to transport the sheet into chute 34. Chute 34 directs the advancing sheet of support material into contact with photoconductive surface 12 of drum 10 so that the powder image developed thereon contacts the advancing sheet at transfer station D.

Preferably, transfer station D includes a corona generating device 36 which sprays ions onto the back side of the sheet. This attracts the powder image from photoconductive surface 12 to the sheet. After transfer, the sheet continues to move in the direction of arrow 40 onto a conveyor 38 which transports the sheet to fusing station E.

Fusing station E includes a fuser assembly, indicated generally by the reference numeral 42, which permanently affixes the transferred toner powder image to the sheet. Preferably, fuser assembly 42 includes a heated fuser roller 44 and back-up roller 46. The sheet passes between fuser roller 44 and back-up roller 46 with the powder image contacting fuser roller 44. In this manner, the powder image is permanently affixed to the sheet. After fusing, forwarding rollers 48 advance the sheet to catch tray 50 for subsequent removal from the printing machine by the operator.

It is believed that the foregoing description is sufficient for purposes of the present application to illustrate the general operation of an electrophotographic printing machine incorporating the features of the present invention therein.

Referring now to the specific subject matter of the present invention, the primary components of development system 20 are developer housing 52, paddlewheel 54, developer roller 56, and toner dispenser 58. Paddlewheel 54 is a cylindrical member with buckets or scoops disposed about the periphery thereof. As paddlewheel 54 rotates, the developer material is elevated from the lower region of the chamber of housing 52 to developer roller 56. The magnetic field produced by the fixed magnets in developer roller 56 attract the developer material from paddlewheel 54 thereto. Developer roller 56 transports the developer material into contact with the electrostatic latent image recorded on photoconductive surface 12 of drum 10. A surplus of developer material is furnished. Metering blade 60 controls the amount of developer material transported into contact with the electrostatic latent image. Preferably, developer roller 56 includes a non-magnetic tubular member 62 having an irregular or roughened exterior surface. Tubular member 62 is journaled for rotation by suitable means such as ball bearing mounts. A shaft assembly is concentrically mounted within tubular member 62 and serves as a fixed mounting for magnetic member 64. The shaft assembly also can act as part of the magnetic circuit. Tubular member 62 rotates in the direction of arrow 66.

Figure 2:
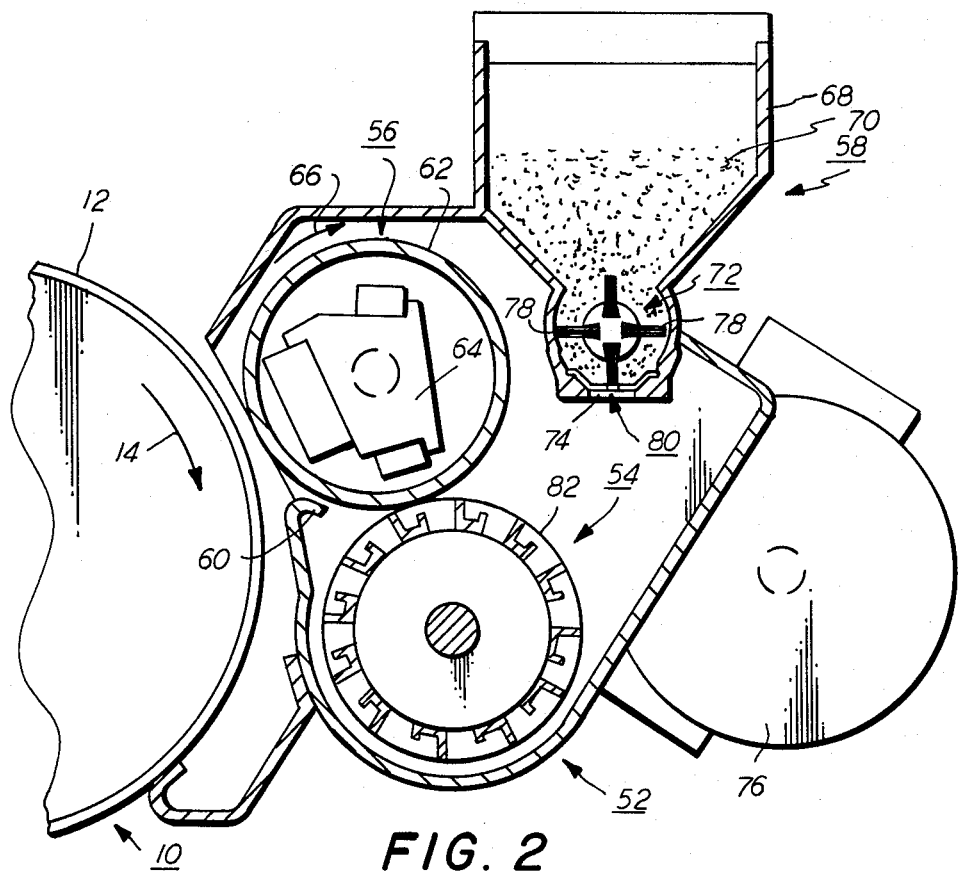
FIG. 2 is an elevational view depicting the development system of the FIG. 1 printing machine having the toner dispenser of the present invention.

Toner dispenser 58 includes a container 68 having a chamber 70 storing a supply of toner particles therein. A brush 72 is positioned exteriorly of open end 74 in container 68. Motor 76 rotates brush 72. As brush 72 rotates, the rows of bristles 78 periodically engage screen 80 disposed in open end 74 of container 68. Bristles 78 discharge the toner particles from chamber 70 of container 68 through screen 80. As shown in FIG. 2, four discrete continuous rows of bristles 78 are used in brush 72. Thus, in the operative mode, when motor 76 is rotating brush 72, bristles 78 discharge toner particles from chamber 70 of container 68 into chamber 82 of developer housing 52. Motor 76 is coupled to suitable logic circuitry which controls the positioning of brush 72. In this way, when motor 76 is de-energized, it automatically positions one row of bristles 78 of brush 72 in engagement with screen 80 so as to seal the open end 74 of chamber 70 in container 68. Alternatively, one row of bristles 78 may be manually positioned in engagement with screen 80 to seal the open end 74 of chamber 70 in container 68. In this way, when the printing machine is in the inoperative mode, chamber 70 of container 68 is sealed preventing the discharge of toner particles therefrom. It is this latter mode of operation that is employed when the printing machine is transported from the manufacturing site to the customer site. In this way, chamber 70 of container 68 may be fully loaded with toner particles prior to the shipment of the printing machine from the manufacturing facility to the customer site.

Figure 3:
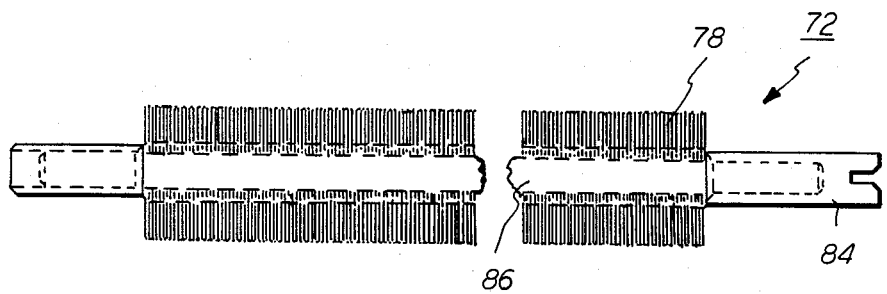
FIG. 3 is an elevational view showing the brush of the FIG. 2 toner dispenser.
Figure 4:
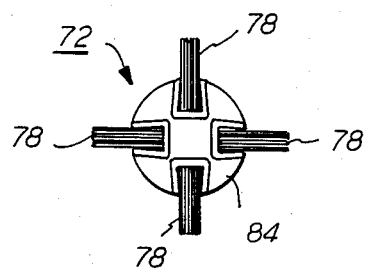
FIG. 4 is a side elevational view depicting the FIG. 3 brush.

Turning now to FIGS. 3 and 4, there is shown the detailed structure of brush 72. As illustrated thereat, brush 72 includes a substantially rigid shaft 84 having four equally spaced grooves 86 disposed about the peripheral surface thereof. A row of bristles 78 is positioned in each groove 86. Thus, bristles 78 extend outwardly from shaft 84 at substantially equal angular positions thereabout, i.e. every 90°. By way of example, shaft 84 may be molded from a suitable polyamide material, i.e. Nylon. As depicted in FIG. 4, four continuous rows of bristles 78 extend outwardly from shaft 84. Each row of bristles 78 is spaced about 90° from the next adjacent row of bristles. The thickness of the bristles is sufficient to seal the open end 74 of chamber 70 in container 68 (FIG. 2). Shaft 84 is designed for fast and simple installation in chamber 70 of contamter 68. This is achieved by providing appropriate clearances between the shaft and plastic bearing support blocks in the container.

Figure 5:
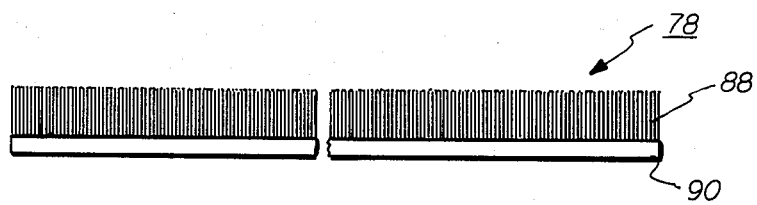
FIG. 5 is an elevational view showing one row of bristles of the FIG. 3 brush.

Referring now to FIG. 5, there is shown one row of bristles 78. As illustrated thereat, bristles 78 comprise individual fibers 88 secured in a U-shaped metal strip 90. The free end portions of metal strip 90 are bent toward one another to secure each fiber 88 therein. In this way, a continuous row of fibers 88 is formed which extend along the length of U-shaped member 90. U-shaped member 90 with fibers 88 extending outwardly therefrom in a continuous row, is then mounted in grooves 86 of shaft 84 to form brush 72. Preferably, each fiber 88 is made from a polyamide material, e.g. a natural Tynex Nylon having a 0.003 inch diameter. By way of example, the length of the fibers extending outwardly from U-shaped member 90 is preferably about 0.35 inches.

Figure 6:
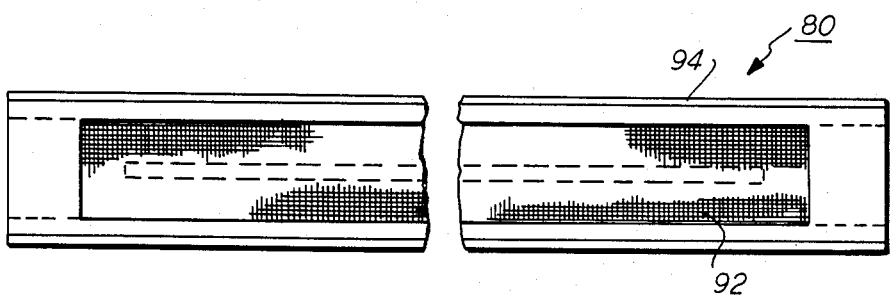
FIG. 6 is a plan view illustrating the screen employed in the FIG. 2 toner dispenser.

FIG. 6 shows screen 80 in detail. As illustrated thereat, screen 80 includes a mesh wire 92 mounted in a holder 94. Screen 80 slides into place and is secured in grooves in the side walls of container 68 in the open end 74 of chamber 70. Preferably, mesh wire 92 is a 40 by 40 square mesh made from 0.0065 diameter, non-magnetic 316 stainless steel wire cloth. Holder 94 is made preferably from an extruded metal, such as aluminum.

In recapitulation, it is evident that the apparatus of the present invention employs a container for storing a supply of toner particles therein. The container is open ended and has a brush having discrete continuous rows of bristles extending outwardly therefrom which engage the screen located in the open end of the chamber. In the operative mode, the brush rotates so as to discharge toner particles from the chamber of the housing. In the inoperative mode, the motor automatically positions the brush such that a continuous row of bristles is located in contact with the screen in the open end of the chamber of the container. This row of bristles seals the chamber of the container preventing the discharge of toner particles therefrom. Hence, the toner dispenser of the present operation operates in two modes. In one mode, it discharges toner particles, while in the other mode, it prevents the discharge of toner particles and seals the toner container. In this way, the electrophotographic printing machine may be shipped from the manufacturing site to the customer facility with the toner container being fully loaded with toner particles.

It is, therefore, evident that there has been provided in accordance with the present invention a dual mode toner dispenser. In one mode of operation, the dispenser discharges toner particles therefrom while in the other mode it prevents the discharge of toner particles therefrom. This apparatus fully satisfies the aims and advantages hereinbefore set forth. While this invention has been described in conjunction with a specific embodiment thereof, it is evident that many alternatives, modifications and variations will be apparent to those skilled in the art. Accordingly, it is intended to embrace all such alternatives, modifications and variations as fall within the spirit and broad scope of the appended claims.

What is claimed is:
1. An apparatus for discharging particles, including:
means, defining a chamber having at least one open end, for storing a supply of particles therein; and
a movable brush having at least one row of bristles being of at least a size equal to the size of the open end of the chamber in said storing means and being positioned adjacent the open end of the chamber of said storing means, said brush, in the operative mode, being movable to discharge particles from the open end of the chamber in said storing means, and, in the inoperative mode, always being positioned to locate the row of bristles in the open end of the chamber of said storing means to seal the chamber of said storing means preventing the discharge of particles therefrom.

2. An apparatus for discharging particles, including:

means, defining a chamber having at least one open end, for storing a supply of particles therein; and a movable brush having a plurality of spaced rows of bristles with each row of bristles being of a width at least equal to the width of the open end of the chamber of said storing means with the space between adjacent rows of bristles being of a width at least equal to the width of a row of bristles, said brush, in the operative mode, being movable to discharge particles from the open end of the chamber in said storing means, and, in the inoperative mode, always being positioned to locate a row of bristles in the open end of the chamber of said storing means to seal the chamber of said storing means.

3. An apparatus according to claim 2, further including means for rotating said brush, in the operative mode, to discharge particles from the open end of the chamber in said storing means and, in the inoperative mode, for indexing said brush to position one of the rows of bristles in the open end of the chamber of said storing means to seal said storing means.

4. An apparatus according to claim 3, further including a screen mounted in the open end of the chamber of said storing means.

5. An apparatus according to claim 4, wherein said brush includes a substantially rigid shaft having the rows of bristles extending outwardly therefrom.

6. An apparatus according to claim 5, wherein each row of bristles includes a strip having bristles extending outwardly therefrom with each strip being substantially equally spaced from one another and secured to the peripheral surface of said shaft.

7. An apparatus according to claim 6, wherein each bristle of said strip is made preferably from a polyamide material.

8. An apparatus for developing an electrostatic latent image recorded on a photoconductive member, including:

a housing defining a chamber for storing a supply of developer material comprising at least carrier granules and toner particles therein;

means, defining a chamber having at least one open end, for storing a supply of toner particles therein; and a movable brush having at least one row of bristles being of at least a size equal to the size of the open end of the chamber in said storing means and being positioned adjacent the open end of the chamber of said storing means, said brush, in the operative mode, being movable to discharge toner particles from the open end of the chamber in said storing means into the chamber of said housing, and, in the inoperative mode always being positioned to locate the row of bristles in the open end of the chamber of said storing means to seal the chamber of said storing means preventing the discharge of toner particles therefrom into the chamber of said housing.

9. An apparatus for developing an electrostatic latent image recorded on a photoconductive member, including:

a housing defining a chamber for storing a supply of developer material comprising at least carrier granules and toner particles therein;

means, defining a chamber having at least one open end, for storing a supply of toner particles therein; and a movable brush having a plurality of spaced rows of bristles with each row of bristles being of a width at least equal to the width of the open end of the chamber of said storing means with the space between adjacent rows of bristles being of a width at least equal to the width of a row of bristles, said brush, in the operative mode, being movable to discharge toner particles from the open end of the chamber in said storing means into the chamber of said housing, and, in the inoperative mode, always being positioned to locate a row of bristles in the open end of the chamber of said storing means to seal the chamber of said storing means.

10. An apparatus according to claim 9, further including means for rotating said brush, in the operative mode, to discharge particles from the open end of the chamber in said storing means and, in the inoperative mode, for indexing said brush to position one of the rows of bristles in the open end of the chamber of said storing means to seal said storing means.

11. An apparatus according to claim 10, further including a screen mounted in the open end of the chamber of said storing means.

12. An apparatus according to claim 11, wherein said brush includes a substantially rigid shaft having the rows of bristles extending outwardly therefrom.

13. An apparatus according to claim 12, wherein each row of bristles includes a strip having bristles extending outwardly therefrom with each strip being substantially equally spaced from one another and secured to the peripheral surface of said shaft.

14. An apparatus according to claim 13, wherein each bristle of said strip is made preferably from a polyamide material.

* * * * *